United States Patent [19]

Regas et al.

[11] Patent Number: 4,806,953

[45] Date of Patent: Feb. 21, 1989

[54] ACOUSTIC ISOLATION TIMING BELT PULLEY FOR DRAFTING PLOTTERS

[75] Inventors: Kenneth A. Regas, Poway; Erich E. Coiner, San Diego; Frederich W. Beilicke, Escondido, all of Calif.

[73] Assignee: Hewlett-Packard Company, Palo Alto, Calif.

[21] Appl. No.: 19,405

[22] Filed: Feb. 26, 1987

[51] Int. Cl.$^4$ .............................................. G01D 15/24
[52] U.S. Cl. ..................... 346/136; 346/1.1; 346/134; 181/207; 181/208; 181/209; 464/180
[58] Field of Search ................. 181/207, 208, 209; 318/611; 464/180; 188/378; 346/134, 136, 1.1; 400/689, 690

[56] References Cited

U.S. PATENT DOCUMENTS 4,067,184 1/1978 Johnson, Jr. .................. 181/207
4,384,298 5/1983 Labarre et al. ................ 346/134

FOREIGN PATENT DOCUMENTS 0062172 4/1984 Japan .............................. 400/689
0248762 11/1986 Japan .............................. 400/689

OTHER PUBLICATIONS

Gontarek et al., "Noise Reducing Coupling", IBM Tech. Bulletin, vol. 24, No. 1A, 6/81.

Gontarek et al., "Acoustic Isolation Mounting", IBM Tech. Discl. Bulletin, vol. 24, No. 5, 10/81.

Primary Examiner—E. A. Goldberg
Assistant Examiner—Huan H. Tran
Attorney, Agent, or Firm—William J. Bethurum

[57] ABSTRACT

Acoustic noises are suppressed in a large format drafting plotter (10) utilizing a paper drive motor (22) mechanically coupled to a paper drive shaft (20) by a geared timing belt (26) from the motor to a pulley (24) on the drive shaft by suitably modifying the pulley. The pulley is modified by enlarging the drive shaft hole (38) in the center thereof so as to provide slip-mounting of the pulley on the drive shaft. A winged clamp (30) is provided, mounted on the pulley, and having a central portion (34) having an opening (36) therethrough for engaging a portion of the drive shaft and a tightening screw (40) for securing the winged clamp to the drive shaft. The winged clamp also has two opposed extensions (42), which are each maintained between a pair of bosses (44) on the outside surface (24a) of the pulley, and isolated therefrom by a pair of isolator pads (32) comprising a compliant material. The isolator pads serve to reduce the resonant amplification of objectionable acoustic noise by the spring-mass system (the drive shaft and the drive roller (16)) by absorbing oscillation energy in the compliant material.

19 Claims, 2 Drawing Sheets

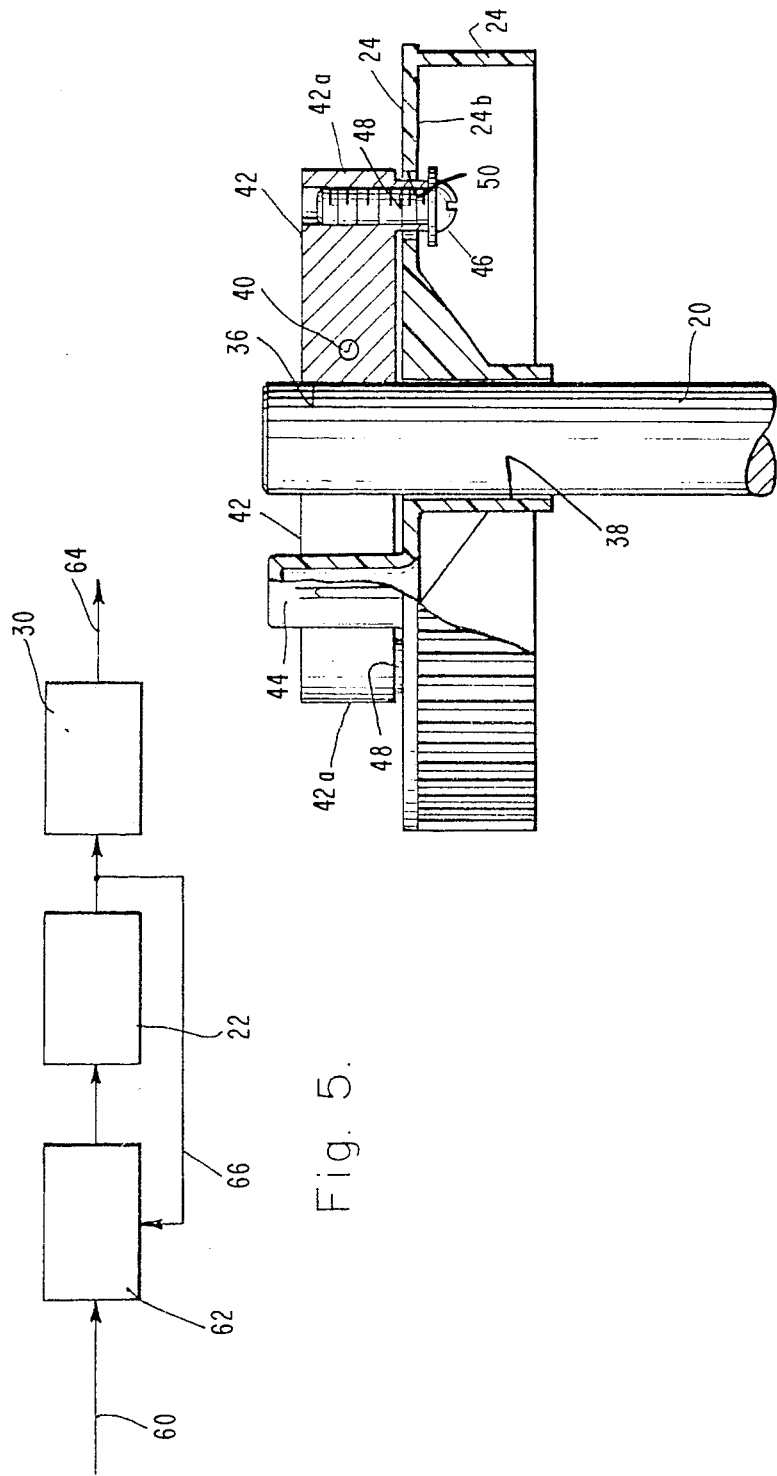

ACOUSTIC ISOLATION TIMING BELT PULLEY FOR DRAFTING PLOTTERS

TECHNICAL FIELD

The present application relates to suppressing acoustic misbehavior in any high-performance positioning servo caused by drive-train resonance, and, more particularly, to reducing noise in the paper drive system of drafting plotters.

BACKGROUND ART

In a drafting plotter, paper and pen move in perpendicular directions over a platen. Motion of the paper is controlled by a drive roller and pinch roller scheme. The drive roller is rotated by a servo-controlled motor-encoder unit acting through a timing belt.

In early prototypes, loud screeching noises emanated from the paper due to amplification of noises intrinsic to digital servo control (namely, servo limit-cycle due to quantization of time and space) resulting from the interaction of the motor-control digital servo and a highly resonant spring-mass system comprising the drive shaft (the spring) and the drive roller (the mass).

One approach to solve this problem would be to add damping between the oscillating elements (the drive roller and paper) and mechanical "ground", such as by using very viscous grease in the drive roller bearings. This approach, however, would waste vast amounts of motor power and would not add damping where it was most needed to suppress the oscillations: in mechanical parallel with the drive shaft, i.e., between motor and drive roller.

A second approach would be to encase the drive shaft with a suitably damped material, to overcome both the objections to the first approach. However, there appear to be no known materials suitable for this purpose, especially in light of space constraints.

A third approach would be to change the drive shaft from steel (the present material) to some less resilient (i.e., more damped) material. However, materials having the requisite damping yet retaining steel's low cost, bending stiffness, and bending strength—needed to sustain design loads (such as timing belt side load)—are not readily available.

Fourthly, another physically resonant system could be added to the paper drive assembly, tuned to suppress the natural oscillations of the first system. However, the success of such a strategy depends on very precise tuning, which is theoretically possible but not realistic in light of the real-world variation in the dynamic behavior of real drafting plotters, both from machine to machine, and over the lifetime of a single machine. This variation stems from part and assembly variations in the factory, material non-linearity and property changes versus temperature, humidity, age, etc., and from the range of sizes and types of plot media the device plots on. In addition, because this strategy would increase dynamic complexity of the mechanical system, it would add considerable complexity to the control problem.

Fifthly, the servo controller could be "tuned" to actively suppress this interaction. Again, this scheme is much too complex and sensitive to real-world variations bo be practical.

Sixthly, the inertias of motor and/or drive roller could be greatly reduced, or the drive shaft that links them made much stiffer (such as by increasing its diameter) so that the oscillations of the drive train would become both smaller in amplitude and higher in frequency, enough so that they could no longer meaningfully interact with the digital servo. Extremely low inertia motors and drive rollers are expensive, while constraints on drive shaft diameter and inertia prevent its stiffness from being arbitrarily increased.

Finally, the quantization errors which give rise to acoustic noise could themselves be suppressed. The sample rate of the digital servo and the resolution of the shaft encoder used to provide motor position information could both be increased. These are both very expensive undertakings requiring major architectural changes in the design of a plotter, not realistically available when low cost and easy retrofit to existing designs are required.

Accordingly, a need remains to provide a plotter employing a low cost drive scheme, in the presence of resiliantly compliant drive train components, with means to suppress the transmission and amplification of acoustic noise originating in the motor control servo.

DISCLOSURE OF INVENTION

In accordance with the invention, an acoustic isolation device is provided for use with high performance positioning servos, such as large format drafting plotters which employ a paper drive motor, a drive roller for moving paper or other media and a drive shaft for coupling the motor to the drive roller. The device of the invention places a component of specified compliance and damping in mechanical series with an otherwise resilient drive-train, so that acoustic noises originating in the motor servo controller cannot be amplified by drive train resonant oscillations and their interaction with the servo controller.

In one particular embodiment, the device comprises a pulley, slip-mounted on the drive end of the paper drive shaft and rotated by a geared timing belt coupled to the paper drive motor. The pulley is provided with a winged clamp having a central portion secured to the drive shaft and a pair of opposed extensions, each extension maintained between a pair of compliant isolator pads.

The acoustic isolation device of the invention permits the use of inexpensive parts (motor, encoder, drive train), and suppresses the transmission and oscillatory amplification of acoustic energy arising from quantization errors in a low-cost digital servo. Also, the device permits facile retrofit of existing plotters in which acoustic vibrations are a problem.

BRIEF DESCRIPTION OF THE DRAWINGS

FIG. 4 is a cross-sectional view of the acoustic isolation device, taken along the line 4—4 of FIG. 3; and FIG. 5 is a flow chart of the paper drive system.

BEST MODES FOR CARRYING OUT THE INVENTION

Figure 1:
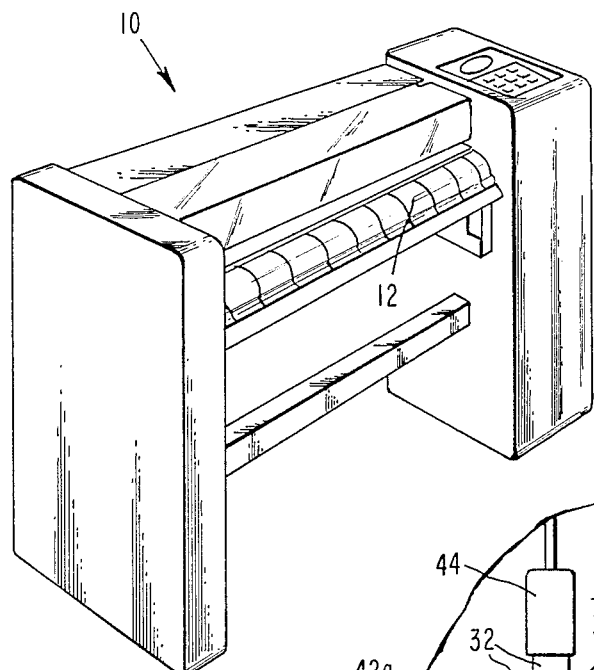
FIG. 1 is a perspective view of a large format drafting plotter to which the invention may be applied.
Figure 3:
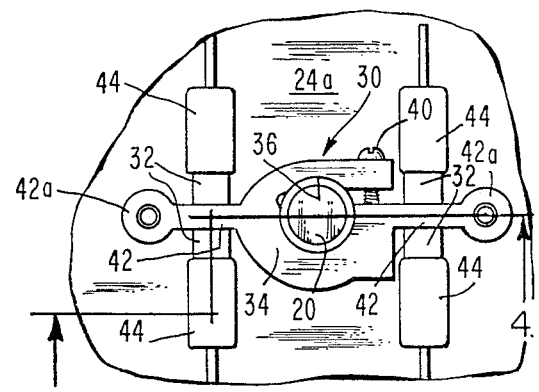
FIG. 3 is a plan view of the acoustic isolation device of the invention.
Figure 2:
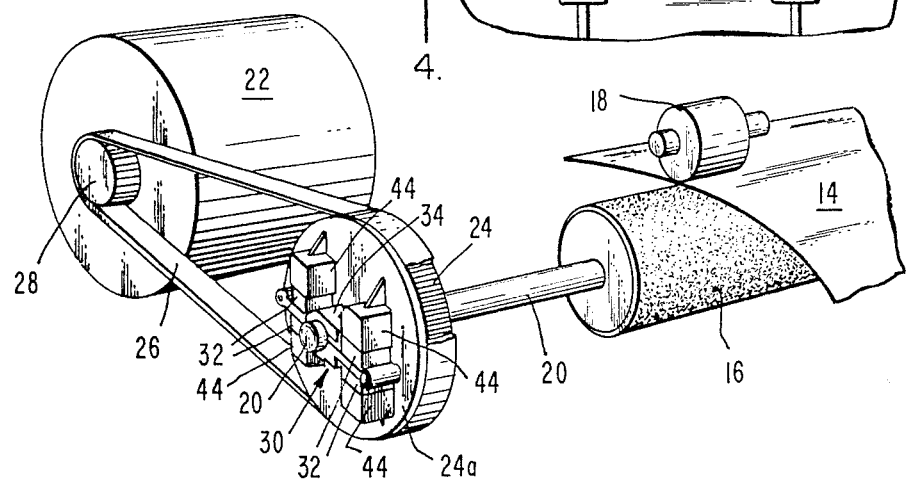
FIG. 2 is a perspective view of the paper drive system, including the acoustic isolation device of the invention.

The embodiment disclosed below is directed to a large format drafting plotter. However, it will be appreciated by those skilled in the art that the acoustic device of the invention may be employed in suppressing acoustic misbehavior in any high-performance positioning servo in which the cause of the acoustic misbehavior is a drive-train resonance.

Referring now to the drawings wherein like numerals of reference designate like elements throughout, a large format drafting plotter is depicted generally at 10. The drafting plotter includes the usual elements of a carriage for supporting a pen, a motor for moving the carriage bidirectionally and orthogonal to the direction of the plotting medium, a carousel or turret for storing a quantity of pens for plotting, means for rotating the turret to select a particular pen, and a microprocessor for controlling these elements. Such elements are commonly known for such plotters and are not shown herein.

Additional elements of such plotters germane to the following discussion include a surface 12 for supporting a medium 14 upon which the plot is made, a drive roller 16 for moving such a medium, pinch rollers 18 for holding the medium against the drive rollers, a drive shaft 20 for supporting the drive rollers, and a paper drive motor 22 coupled to a reduction pulley 24 by a geared timing belt 26 rotatably attached to a pinion 28 of the paper drive motor. The drive roller 16 is covered with a grit material for holding the medium 14; the pinch rollers comprise a resilient material and are in light deformed contact with the drive roller through the medium.

In accordance with one embodiment of the invention, the reduction pulley 24 is provided with a winged clamp 30 and four isolation pads 32. The winged clamp 30 has a central portion 34 provided with an opening 36 therethrough for receiving a portion of the drive shaft 20. The opening 36 of the winged clamp 30 aligns with an opening 38 of the pulley 24. The drive shaft 20 passes through the opening 38 of the pulley 24 in slip-mounting fashion.

The central portion 34 of the winged clamp is also provided with a fastening means 40 for securing the winged clamp 30 to the drive shaft 20. For example, a tightening screw may be suitably employed.

The winged clamp 30 further comprises a pair of opposed extensions 42, which are each mounted between a pair of isolator pads 32, supported by a pair of boss members 44, which extend outwardly from the outside surface 24a of the pulley 24.

The winged clamp 30 is mounted on the outside surface 24a of the reduction pulley 24 by a fastening means 46. Such fastening means may comprise a pair of screws which are threadably engaged in a pair of reduced portions 48 in the ends 42a of the extension 42 of the winged clamp 30 through an associated pair of openings 50 in the pulley 24. The screws 46 are mounted from the inside 24b of the pulley 24. An associated pair of washers complete securement of the winged clamp 30 to the pulley 24.

The materials used in the winged clamp 30 itself typically comprise aluminum or some other suitably light and rigid material. The bosses 44 on the outside surface 24a of the pulley 24 comprise the material used in fabricating the pulley and may be formed integral therewith.

In a digitally controlled, large format drafting plotter 10 employing paper drive motor 22 coupled to the drive shaft 20 by a timing belt 26, objectionable acoustic noise can be generated because of interaction between the digital controller and an oscillating spring-mass system in the drive train, excited by quantization noise in the controller itself.

The acoustic isolation device 30 of the invention is configured to made the spring-mass system in the drive train both less stiff and less resilient (more damped), suppressing the amplification of objectionable acoustic noise (typically above about 200 Hz), while retaining enough stiffness to transmit motor position to paper position in the lower range of frequencies (from 0 to about 150 Hz) needed to produce good-looking plots.

This device thus owes its utility to the counter-intuitive idea of adding compliance in the drive train of a high precision position control mechanism, between the object controlled (the plot medium 14) and the motor 22 and position encoder by which it is controlled. Correct selection of both the amount of compliance added and the damping associated with that compliance ensures that motor-encoder position is transmitted to paper (and vice versa) with fidelity in the range of frequencies important to plot quality, while acoustically objectionable noise inadvertently generated in the digital control loop is kept from being amplified by interaction of the digital controller with drive train resonances.

What is counter-intuitive about this idea is that when one's objective is to control precisely the position of an element at the end of a mechanical drive train, and oscillations in that drive train induced by its compliant nature cause a problem, one does not generally propose to increase that compliance yet further, degrading the link between the output and both the motor which positions it and the encoder which reports its ostensible position to a controller.

The material used for the isolator pads 32 should be a good damping material (such as rubber) and should hold its properties over the plotter's range of service temperatures —about 0° to 40° C. The particular hardness of the material that should be used depends on the amount of compliance to be added to the system and the dimensions of the assembly in which it is placed. Specifically, if A represents the (constant) cross-sectional area of one pad 32 sectioned by a plane normal to the line of action of the compressive force it sustains, and if R represents the distance from the centerline of drive shaft 20 to that line of action, and if H represents the height of that pad 32 in the direction of that line of action, and if E represents the compressive stiffness modulus of isolator pad 32, which is related to its hardness and can be determined by a tensile test at the frequency, temperature and range of deformation expected in actual service, and if C represents the torsional compliance of the invention disclosed herein, comprising four such isolator pads 32 equivalently situated, then a formula relating C with A, R, H and E is given by:

$$1/C = K \times (4 \times A \times E \times R^2)/H,$$

where K is a factor accounting for subtle effects of frequency and the shape of isolator pad 32, equal to unity if compressive modulus E is measured at an appropriate frequency using a material sample having the same shape as pad 32.

Experimentation is the best way to determine how much compliance can be added to a drive train to suppress acoustic noise while retaining precise positioning. Such experimentation is not considered undue, based on the disclosure herein. As a rough guidance for the scope of this experimentation, one may compute the compliance required to reduce system resonant frequency to a reasonable starting point, such as 200 Hz in the case of a digital plotter.

Let $J_1$ represent the torsional inertia of the assembly comprising he motor 22, pinion 28, timing belt 26, and reduction pulley 24, all reflected to the drive shaft 20 (that is, multiplying the inertias of components spinning at the motor's speed by the square of the ratio of motor speed to drive shaft speed). Let $J_2$ represent the inertia of the assembly comprising the drive shaft 20, winged clamp 30, drive roller 16, and plot medium 14, similarly reflected to the motor 22. Consider the inertias of components not mentioned (such as the isolator pads 32) to be negligible. Let $C_1$ be the compliance of the drive shaft and let $C_2$ represent the compliance required to be provided by the isolator pads 32. Then $C_2$ is given by the formula:

$$C_2 = C_0 - C_1,$$

where $C_0$ is the desired system compliance, approximated (for desired system resonant frequency $F_0$, e.g., 200 Hz) by the formula:

$$1/C_0 \approx 4 \times \pi^2 \times F_0^2 \times J_1 \times J_2/(J_1+J_2)$$

A suitable material for the isolator pads 30 is chlorobutyl rubber designated RU234 and available from Rubber Urethanes (Azuza, Calif.). This material evidences a resilience of about 9% (rise of pendulum on damping test after bouncing off the rubber), a Shore "A" hardness of about 52 to 58, and relative stability of properties over the desired temperature range.

In operation, the reduction pulley 24 is free to rotate on the drive shaft 20. When torque is applied to the reduction pulley 24 by the timing belt 26, it transmits this torque, in the form of forces exerted on the extensions or wings 42 of the winged clamp 30, through the isolator pads 32. Placing the isolator pads 32 in the drive train in this manner suppresses the transmission and amplification of acoustic noise originating in the digital motor controller. By careful selection of compliant material and the geometry of the design, as described above, the foregoing benefit is realized while adequate system rigidity is maintained, which is necessary for the $\pm 0.001$ inch control of paper position needed to achieve a high degree of plot quality.

As shown in the block diagram in FIG. 5, the motion control system comprises a reference position 60 (obtained from the microprocessor), a servo controller 62, the motor-encoder 22, the winged clamp 30 (compliant link), and the actual paper position 64. A feedback loop 66 is after the motor-encoder 22 back to the servo controller 62. Thus, the compliant link 30 is in a high-precision, position control application, outside of the feedback loop 66.

Use of the device of the invention provides a downward shift in the frequency of the resonant peak and a considerable reduction in the amplitude of the resonance peak.

The particular values of frequency shift and amplitude reduction are dependent upon the particular materials and geometry, as related in the above equations. For example, in one embodiment of the winged clamp 30, the four isolator pads 32 were molded of a chlorobutyl rubber having a Shore A hardness of 52 to 58 and a pendulum rebound test resilience of about 9%. Before assembly in the pulley 24, their cross-section measured 5 mm×7 mm, so that area A was 35 mm$^2$, and their height was 5 mm. After assembly, the pads were compressed to an operating height of 4.4 mm.

In the plotter for which the device of this invention was devices, radius R is 14.5 mm and inertias $J_1$ and $J_2$ are $151 \times 10^{-6}$ and $62 \times 10^{-6}$ Nms, respectively. Thus constructed, the pulley assembly of the invention, comprising reduction pulley 24, winged clamp 30, and four isolator pads 32, produced a system natural frequency $F_0$ of approximately 215 Hz, which corresponds to a compliance of about 0.012 rad/Nm. The damping ratio of this system was about 21%, corresponding to a damping of about 0.025 Nm/(rad/s).

Without the benefit of the device of the invention, the system natural frequency had been about 325 Hz, with a damping ratio of only about 5%. These figures correspond to compliance and damping of about 0.0058 rad/Nm and 0.0090 Nm/(rad/s), respectively. Thus, by roughly doubling the compliance of the link from motor 22 to drive roller 16 with a highly damped material, a four-fold increase in damping ratio was induced. This increased damping produced a roughly four-fold reduction in the size of the natural resonant oscillations of the spring-mass system, while bringing the oscillations down in frequency of about 34%.

Other suitable approaches based on the teachings herein may also be employed. All such approaches are based on specifying a compliant and internally damped material employed in a geometry such that the drive train is stiff enough to produce precise positioning in a low range of frequencies, while it suppresses the oscillatory amplification of higher-frequency acoustic noise inadvertently generated by a controller.

INDUSTRIAL APPLICABILITY

The acoustic isolation device of the invention is expected to find use on large format drafting plotters, which employ a paper drive motor mechanically coupled to the paper drive shaft by a geared belt. In particular, the winged clamp 30 may be included on such plotters as manufactured or retro-fit to existing plotters.

The acoustic isolation device of the invention is also expected to find use in other types of machinery which employ high-performance, position-control servos, such as robots, assembly and packaging machinery, disk drives, printers, etc., whenever drive-train resonances can interact with a control loop to produce unacceptable oscillatory behavior.

Thus, an acoustic isolation timing belt pulley for drafting plotters and other high-performance positioning servos is provided. It will be appreciated that many changes and modifications may be made without departing from the spirit and scope of this invention, and accordingly, all such changes and modifications are deemed to fall within the scope of the invention, as defined by the appended claims.

What is claimed is:

1. An acoustic isolation device for suppressing acoustic misbehavior caused by drive-train resonance in high-performance positioning servos, said device maintained in mechanical series with an otherwise resiliant drive-train and comprising a component having a compliant and internally damped material employed in a geometry such that the thus-modified drive train is still stiff enough to produce precise positioning in a low range of frequencies, while it suppresses the oscillatory amplification of high-frequency acoustic noise inadvertently generated by a controller.

2. The device of claim 1 comprising components inserted in a drive train between a positioning servo motor and an item being positioned, which components increase the compliance of the drive train and add internal damping such that the thus-modified drive train remains stiff enough to transmit position changes at a rate of up to about 150 Hz, while suppressing higher-frequency resonant oscillations.

3. An acoustic isolation device for large format drafting plotters including a paper drive motor, a drive roller for moving a plot medium and a drive shaft for coupling said motor to said drive roller, comprising components inserted in a drive train between a positioning servo motor associated with said paper drive motor and said plot medium being positioned, which components increase the compliance of the drive train and add internal damping such that the thus-modified drive train remains stiff enough to transmit position changes at desired frequencies but rolling off to damp undesired frequencies between said paper drive motor and said plot medium, whereby transmission of acoustic noise from motor to medium is attenuated and resonance of said drive shaft and said drive roller is reduced.

4. The device of claim 3 comprising a compliance with damping stiff enough to transmit up to about 150 Hz, while suppressing higher-frequency resonant oscillations.

5. The device of claim 3 comprising a winged clamp having a central portion secured to said drive shaft and a pair of opposed extensions, each of which is maintained between a pair of resilient isolator pads, said winged clamp configured on a pulley, slip-mounted on the drive end of said drive shaft and rotated by a geared belt coupled to said drive motor.

6. The device of claim 5 wherein said isolator pads have a resilience of approximately 9% and a stiffness (Shore "A") of about 52 to 58.

7. The device of claim 6 wherein said isolator pads comprise a chlorobutyl rubber.

8. The device of claim 5 wherein said isolator pads are laterally supported by boss members on the surface of said pulley.

9. An acoustic isolation device for large format drafting plotters including a paper drive motor, a drive roller for moving a plot medium and a drive shaft for coupling said motor to said drive roller, said device comprising a winged clamp having a central portion secured to said drive shaft and a pair of opposed extensions, each of which is maintained between a pair of resilient isolator pads, said winged clamp configured on a pulley, slip-mounted on the drive end of said drive shaft and rotated by a geared belt coupled to said drive motor.

10. The device of claim 9 wherein said device transmits up to about 150 Hz, while reducing resonance amplitude of said plotter at higher frequencies.

11. The device of claim 9 wherein said isolator pads have a resilience of approximately 9% and a stiffness (Shore "A") of about 52 to 58.

12. The device of claim 11 wherein said isolator pads comprise a chlorobutyl rubber.

13. The device of claim 9 wherein said isolator pads are laterally supported by boss members on the surface of said pulley.

14. The device of claim 9 wherein said winged clamp is secured to a surface of said pulley through openings in said surface aligned with threaded holes in said extension.

15. An acoustic isolation device for large format drafting plotters including a paper drive motor, a drive roller for moving a plot medium and a drive shaft for coupling said motor to said drive roller, said device comprising a winged clamp having a central portion secured to said drive shaft and a pair of opposed extensions, each of which is maintained between a pair of resilient isolator pads having a resilience of approximately 9% and a stiffness (Shore "A") of about 52 to 58, said winged clamp configured on a pulley, slip-mounted on the drive end of said drive shaft and rotated by a geared belt coupled to said drive motor, said isolator pads laterally supported on the surface of said pulley.

16. The device of claim 15 wherein said isolator pads comprise a chlorobutyl rubber.

17. The device of claim 15 wherein said winged clamp is secured to a surface of said pulley through openings in said surface aligned with threaded holes in said extension.

18. A method of reducing acoustic noise and damping resonant oscillations of a spring-mass system in large format drafting plotters including a paper drive motor, a drive roller for moving a plot medium and a drive shaft for coupling said motor to said drive roller through a belt-driven pulley attached to said drive shaft, wherein said drive shaft comprises said spring and said drive roller comprises said mass, said method comprising inserting in the drive train between said paper drive motor and said plot medium components which increase the compliance of said drive train and add internal damping such that the thus-modified drive train remains stiff enough to transmit desired frequencies while attenuating higher-frequency resonance of said drive shaft and said drive roller.

19. A method of reducing acoustic noise and damping resonant oscillations of a spring-mass system in large format drafting plotters including a paper drive motor, a drive roller for moving a plot medium and a drive shaft for coupling said motor to said drive roller through a belt-driven pulley attached to said drive shaft, wherein said drive shaft comprises said spring and said drive roller comprises said mass, said method comprising providing said pulley with slip-fit mounting on said drive shaft and further providing on a surface of said pulley a winged clamp having a central portion secured to said drive shaft and a pair of opposed extensions, each of which is maintained between a pair of resilient isolator pads supported by corresponding boss members on said surface of said pulley.

* * * * *